United States Patent [19]
Murata et al.

[11] Patent Number: 5,386,511
[45] Date of Patent: Jan. 31, 1995

[54] MULTIPROCESSOR SYSTEM AND DATA TRANSMISSION APPARATUS THEREOF

[75] Inventors: Hiroki Murata, Tokyo-to; Shigenori Shimizu, Kawasaki, both of Japan

[73] Assignee: International Business Machines Corporation, Armonk, N.Y.

[21] Appl. No.: 870,539

[22] Filed: Apr. 17, 1992

[30] Foreign Application Priority Data

Apr. 22, 1991 [JP] Japan .................................. 3-116693

[51] Int. Cl.⁶ .............................................. G06F 13/00
[52] U.S. Cl. .................................................. 395/200
[58] Field of Search .......................... 395/200, 325, 425

[56] References Cited
U.S. PATENT DOCUMENTS 4,959,777  9/1990  Holman, Jr. .................... 395/325
5,265,235 11/1993  Sindhu et al. ................... 395/425
5,276,828  1/1994  Dion ................................ 395/425

*Primary Examiner*—Robert L. Richardson
*Attorney, Agent, or Firm*—William A. Kinnaman, Jr.; Richard M. Ludwin

[57] ABSTRACT

The bandwidth of the data transfer among a main memory and snoopy caches is improved by solving the bus bottleneck in a multiprocessor system using a snoopy cache technique. Shared bus coupling is employed for an address/command bus requiring bus snoop whereas multiple data paths coupled by an interconnection network are used for the data bus not requiring bus snoop. The multiple data paths reflect the order of the snoopy operations on the order of data transfer such as to maintain data consistency among the caches.

6 Claims, 5 Drawing Sheets

MAXIMUM BUS BANDWIDTH = BUS CLOCK x CACHE LINE SIZE
= 25MHz x 64BYTES = 1.6G BYTES/SECOND

| BUS CYCLE | 1 | 2 | 3 | 4 | 5 | 6 | 7 | 8 | 9 | 10 |
|---|---|---|---|---|---|---|---|---|---|---|
| BUS SNOOP | Snp 1 | Snp 2 | Snp 3 | Snp 4 | Snp 5 | Snp 6 | Snp 7 | Snp 8 | Snp 9 | Snp 10 |
| DATA TRANSFER 1 |  | D1 | D2 | D3 | D4 | D5 | D6 | D7 | D8 |  |
| DATA TRANSFER 2 |  |  | D1 | D2 | D3 | D4 | D5 | D6 | D7 | D8 |
| DATA TRANSFER 3 |  |  |  | D1 | D2 | D3 | D4 | D5 | D6 | D7 |
| DATA TRANSFER 4 |  |  |  |  | D1 | D2 | D3 | D4 | D5 | D6 |
| DATA TRANSFER 5 |  |  |  |  |  | D1 | D2 | D3 | D4 | D5 |
| DATA TRANSFER 6 |  |  |  |  |  |  | D1 | D2 | D3 | D4 |
| DATA TRANSFER 7 |  |  |  |  |  |  |  | D1 | D2 | D3 |
| DATA TRANSFER 8 |  |  |  |  |  |  |  |  | D1 | D2 |
| DATA TRANSFER 9 |  |  |  |  |  |  |  |  |  | D1 |

FIG. 4

MAXIMUM BUS BANDWIDTH = BUS CLOCK x CACHE LINE SIZE
= 25MHz x 8BYTES = 200M BYTES/SECOND

| BUS CYCLE | 1 | 2 | 3 | 4 | 5 | 6 | 7 | 8 | 9 | 10 |
|---|---|---|---|---|---|---|---|---|---|---|
| BUS SNOOP | Snp 1 |  |  |  |  |  |  |  | Snp 2 |  |
| DATA TRANSFER 1 |  | D1 | D2 | D3 | D4 | D5 | D6 | D7 | D8 |  |
| DATA TRANSFER 2 |  |  |  |  |  |  |  |  |  | D1 |

FIG. 5

MULTIPROCESSOR SYSTEM AND DATA TRANSMISSION APPARATUS THEREOF

BACKGROUND OF THE INVENTION

1. Field of the Invention

This invention relates to tightly coupled multiprocessor systems having a plurality of processors provided with respective private caches and having a shared memory space. More particularly, the invention relates to a technique, used in a multiprocessor employing a snoopy cache technique for maintaining consistency of data among caches, to largely increase the memory-bus transfer bandwidth.

2. Prior Art

Conflicts in access to a shared memory is the most serious bottleneck that prevents an improvement of the system performance in a multiprocessor system of a shared memory type. In order to reduce the bottleneck, techniques using additional private caches provided for respective processors and thereby decreasing the required bandwidth for the shared memory are often used. Further a technique for maintaining the consistency of data among the additional caches, or "snoopy cache" technique is well known. In this technique, each cache always monitors memory access which occurs on the shared bus (the "shared bus" herein means a communication medium to which a plurality of resources are connected and which is concurrently shared by these resources), and performs appropriate operations, if necessary, to a corresponding cache block for maintenance of the consistency of data in terms of other caches and the main memory. Such consistency operations are implemented in hardware. This technique is excellent because the maintenance control of data consistency is performed easily and at a high speed, and it is accordingly broadly adopted. However, the "snoopy cache" technique cannot resolve one significant problem, i.e., bus bottleneck, because it is based on a shared bus architecture. The "snoopy cache" technique is accordingly practical to only small-scaled parallel systems including about ten plus several processors.

On the other hand, as a technique for essentially solving the bus bottleneck problem, an interconnection network (the "interconnection network" herein means a communication medium to which a plurality of resources are connected and which connects them by one to one, or by one to some, by means of a switch) has been studied for a long time. In a multiprocessor system coupled by an interconnection network, the number of coupling links increases with the number of processors constituting the system. Therefore, the interconnection network technology ensures a transfer bandwidth which is proportional to the number of processors, and makes it possible to realize a large-scaled parallel system including hundreds of processors. However, it is impossible for each private cache added to each processor to monitor all memory access by other processors. Therefore, it is theoretically impossible for such a system to perform control of data consistency by hardware implementing the "snoopy cache" technique. Under these circumstances, it is usual to give up consistency control by hardware but rely on software to perform consistency control. In this approach, caches are controlled by software so that copies of the same memory address will never be possessed concurrently by a plurality of caches. More specifically, under control of software protocol, corresponding copies in caches are invalidated by software instructions at an appropriate time to ensure that only one cache possesses the copy at a point of time. Drawbacks of this technique are the increase in load imposed to software and the decrease in performance caused by static invalidation by software instead of dynamically optimizing the use of caches by hardware.

Next, as a prior art technique related to the present invention, a technique combining a snoopy bus and an interconnection network (Bhuyan, L. N.; Bao Chyn Liu; Ahmea, I. "Analysis of MIN based multiprocessors with private cache memories," Proceedings of the 1989 International Conference on Parallel Processing, 8th to 12th August, 1989, pp. 51-58) is discussed briefly. In this technique, a snoopy bus is provided in addition to an interconnection network. Memory access that requires communication among caches for control of data consistency is processed through the snoopy bus, and normal memory access that does not require communication among caches is processed through the interconnection network. In order to decide whether the communication among the caches is required, a table storing conditions of all shared copies in the system is added to each cache. In this technique, the upper limit of the transfer bandwidth is determined by one of the shared buses used for access to shared data and the interconnection network used for access to particular data, selected depending on which is saturated earlier. Therefore, the upper limit of the transfer bandwidth in this technique largely depends on the characteristics of a program to be executed. It is reasonable to consider that, in a multiprocessor system using a snoopy cache technique well designed so as to significantly decrease the cache error ratio, a fraction of the whole access requests occurring on the system bus would be access requests generated by communication among caches for control of data consistency. Therefore, this technique merely realizes a transfer bandwidth several times wider than the bandwidth realized by only the shared bus coupling technique. This technique also requires that each cache should have a management table that describes conditions of the entire system in order to make it possible to locally determine whether access using the shared bus is required or only access using the interconnection network is required. In addition, the control mechanism of this technique becomes complicated because it must control both the shared bus and the interconnection network by using the table.

SUMMARY OF THE INVENTION

This invention has been made in view of the aforementioned circumstances, and has an object to remove the bus bottleneck of the "snoopy cache technique" based on the shared bus coupling, by using simple hardware (control mechanism) without using software on which multiprocessor systems coupled through the interconnection network would have relied for data consistency maintenance.

BRIEF DESCRIPTION OF THE DRAWINGS

FIG. 4 is a timing chart of memory access and bus snoop of the embodiment of FIG. 2;

FIG. 5 is a timing chart of memory access and bus snoop in a multiprocessor using a conventional prior art snoopy cache technique.

DETAILED DESCRIPTION OF A PREFERRED EMBODIMENT OF THE INVENTION

Figure 1:
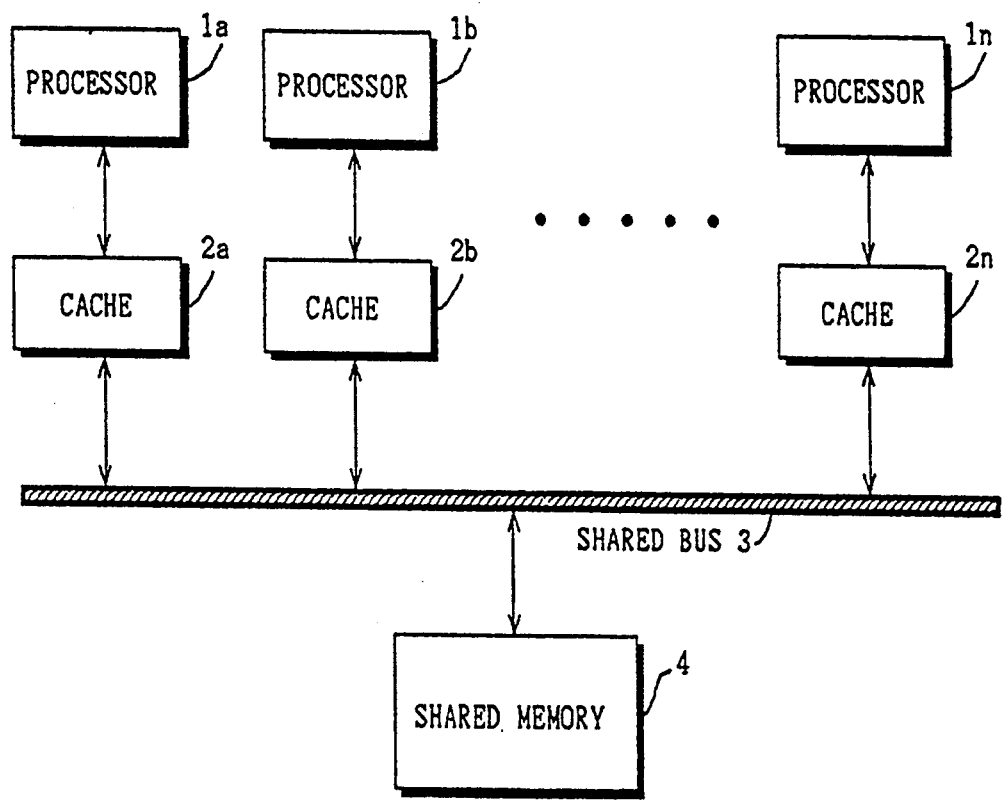
FIG. 1 is a block diagram showing an arrangement of a prior art multiprocessor of a shared-bus, shared memory and snoopy cache type.

FIG. 1 shows a multiprocessor system using the prior art "snoopy cache" technique. In FIG. 1, a plurality of processors $1a$ to $1n$ are connected to a shared bus 3 and a shared memory 4 via their respective private caches $2a$ to $2n$. Each of the private caches $2a$ to $2n$ monitors memory access occurring on the shared bus 3, and maintains data consistency among plural caches by executing an appropriate operation, if necessary, to a corresponding cache block. That is, what is necessary in the snoopy cache technique are that all of the caches monitor address/commands on the shared bus and that the order of the snoop is reflected to the order of data transfer much enough to maintain data consistency among caches (this is realized without any additional means because data is transferred through the bus in the order of the snoop). Accordingly, monitoring the data bus itself is not necessary. On the other hand, in recent high-speed microprocessors, which often use a cache line size as long as 64 bytes or more, such a long cache line is block-transferred on the system bus having a limited bit width by using a plurality of bus cycles (for example, 8 bytes ×8 cycles). That is, the address/command cycle required for the bus snoop is quite a short period of 1 or 2 bus cycles; nevertheless, the system bus is occupied for a significantly long time for transferring the long cache line. The technique according to the invention positively considers the above-mentioned two facts, and uses the shared bus coupling for the address/command bus requiring the bus snoop, but uses multiple data paths coupled by the interconnection network for the data bus not requiring the bus snoop. The multiple data paths, however, must reflect the order of the snoop to the order of data transfer much enough to maintain data consistency among the caches. According to this approach, while the snoopy cache technique is logically applied in its entirety, the interconnection network can be utilized for increasing the transfer bandwidth.

A preferred embodiment of the invention is explained below with reference to FIGS. 2 and 3.

Figure 2:
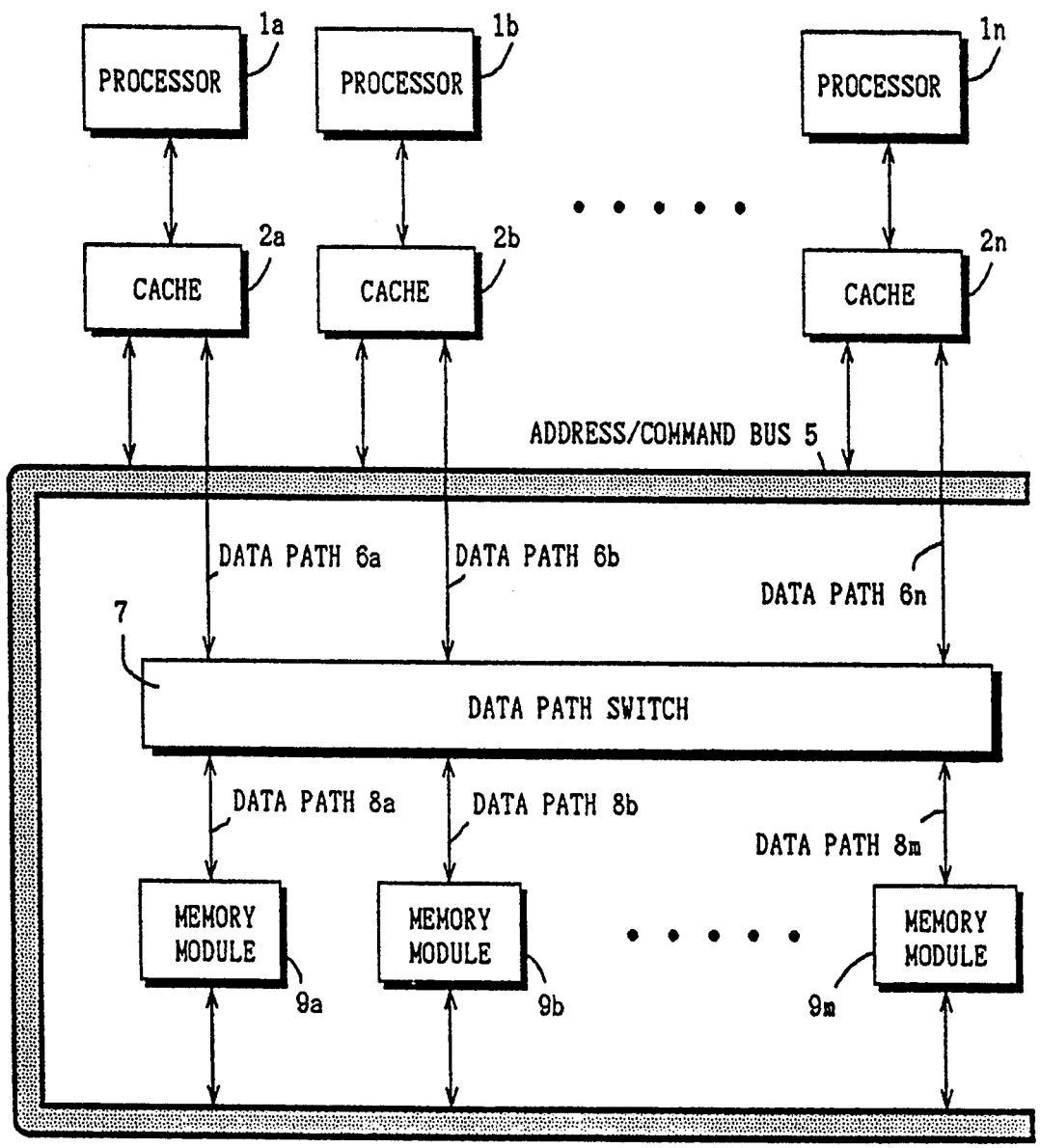
FIG. 2 is a block diagram showing a preferred embodiment of the invention.

In FIG. 2, snoopy caches $2a$ to $2n$ provided for respective processors $1a$ to $1n$ are coupled together by a single address/command bus 5. Snoopy operation for cache consistency control is performed through the address/command bus 5. On the other hand, data path $6a$ to $6n$ from the respective snoopy caches $2a$ to $2n$ are coupled to a shared memory system which consists of a plurality of interleaved memory modules $9a$ to $9m$, via a data path switch 7 and data paths $8a$ to $8m$.

Figure 3:
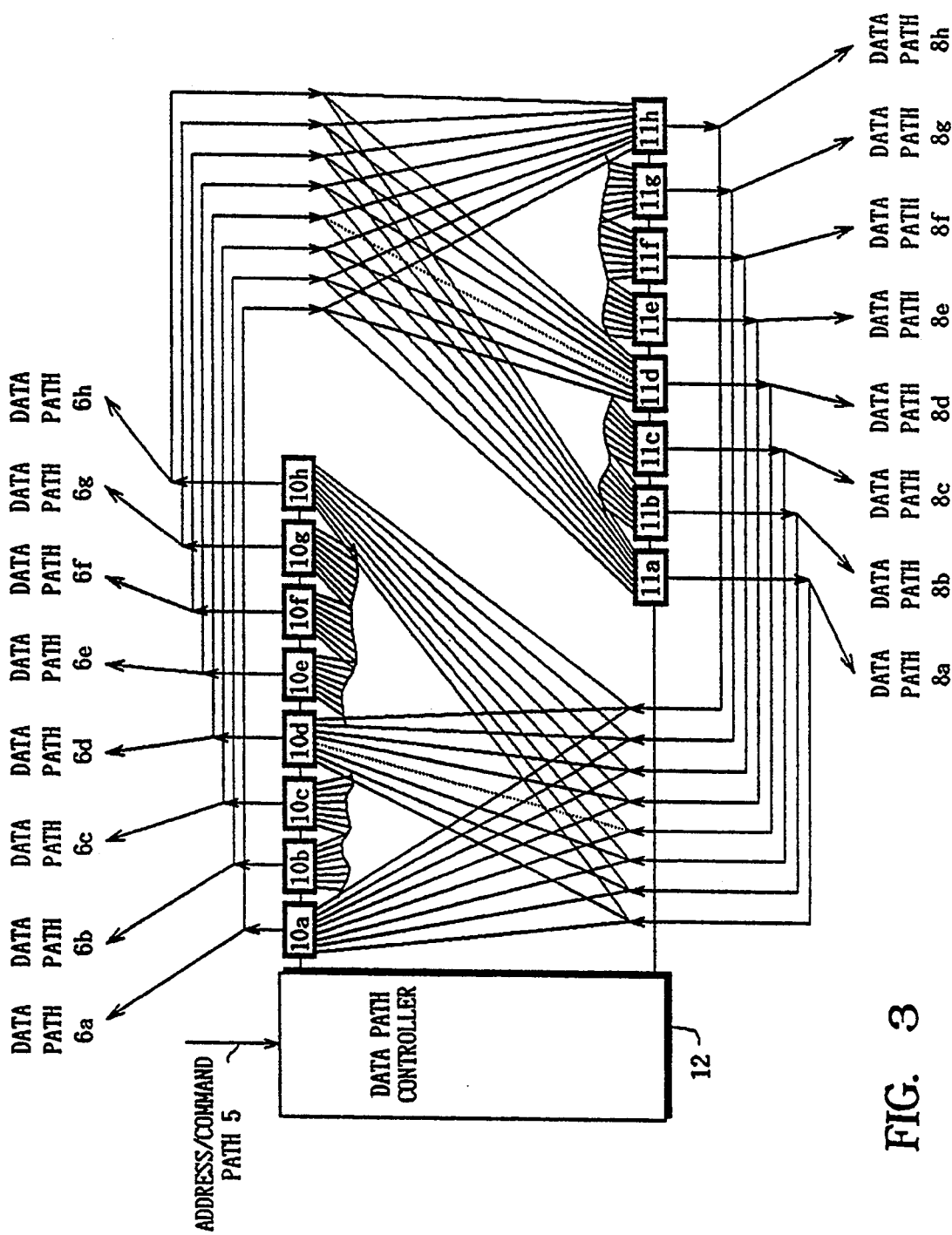
FIG. 3 is a block diagram showing an example of data path switch used in the embodiment of FIG. 2.

FIG. 3 shows an example of the data path switch 7 in which m and n of FIG. 2 are both eight, respectively, that is, processors $1a$ to $1n$ and memory modules $9a$ to $9m$ are 8 sets, respectively. Multiplexers $10a$ to $10h$ select data paths $8a$ to $8h$ of the memory modules $9a$ to $9h$, and connect them to the data paths $6a$ to $6h$ of the snoopy caches $2a$ to $2h$. Multiplexers $11a$ to $11h$ select the data paths $6a$ to $6h$ of the snoopy caches $2a$ to $2h$, and issue them to the data paths $8a$ to $8h$ of the memory modules $9a$ to $9h$. A data path controller 12 controls the multiplexers $10a$ to $10h$ and $11a$ to $11h$ on the basis of address and command on the address/command bus 5, and establishes a data path necessary for data transfer.

Next explanation is directed to a data transfer method between a cache and a memory and among caches with reference to FIGS. 2 and 3. Assume here that the length of the cache line is 8 times wider than the data bus and that data is interleaved into the memory modules $9a$ to $9h$ in such a way that cache lines are stored in order of the youth of their address into the memory modules $9a$, $9b$, ..., $9h$, $9a$, .... For example, the nth, (n+1)th, ..., and (n+7)th cache lines are sequentially stored in the memory modules $9a$, $9b$, ..., and $9h$. In this case, respective parts of the address are used as follows:

A) Several least significant bits will designate respective bytes of data having the data bus width. They are ordinarily transferred in a decoded form as byte enable.

B) Three subsequent less significant bits will designate the location of the data having the data bus width in the cache line.

C) Three subsequent less significant bits will designate a memory module in which the cache line is located.

D) The remaining more significant bits will designate the location of the cache line in the memory module.

Therefore, predetermined several most significant bits are used for changeover of the multiplexers $10a$ to $10h$.

1) When data are read from the memory into a cache:

Consider the case where the snoopy cache $2d$ reads data from the memory module $9d$. Using the address/command issued on the address/command bus 5 by the snoopy cache $12d$, the data path controller 12 controls the multiplexer $10d$ and connects the data path $8d$ to the data path $6d$. Through this data path (shown by a dotted line in FIG. 3), data in the memory module $9d$ are read into the snoopy cache $2d$ in 8 bus cycles.

2) When data are written from a cache into a memory:

Consider the case where the snoopy cache $2d$ writes data into the memory module $9d$. Using the address/command issued on the address/command bus 5 by the snoopy cache $2d$, the data path controller 12 controls the multiplexer $11d$ and connects the data path $6d$ to the data path $8d$. Through this data path (shown by a chain line in FIG. 3), data from the snoopy cache $2d$ are written into the memory module $9d$ in 8 bus cycles.

3) Transfer of data among caches:

Data transfer from a cache to a cache is effected by writing data from a cache into an associated memory module and reading out them again.

FIG. 4 is a timing chart which shows how to multiplex the memory access and the bus snoop. The abscissa indicates the bus cycle by taking bus cycles 1 to 10 as an example. This example shows that access to a certain memory address occurred in the bus cycle 1, and the snoopy operation itself in all the caches has finished in the bus cycle 1 alone, but a long cache line is being block-transferred by using 8 bus cycles 2 to 9. If access to a different memory module occurs in the subsequent bus cycle 2, the processing therefor is started immediately. The snoopy operation finishes in the bus cycle 2 alone, and the cache line is transferred from the memory system to the cache that requests it by using 8 bus cycles 3 to 10. Hereafter, repetition of such conditions is shown. Therefore, under the practical operational conditions, the effective bandwidth is determined by both the contention on the address/command bus and the contention on the memory module; however, under the ideal operational conditions shown in FIG. 4, the theoretical maximum value is determined by a snoopy cycle and a cache line size as easily understood from the expression in the above timing chart. For example, assuming that the snoopy cycle is 40ns (25 MHz), when the data bus width is 8 bytes and the cache line size is 64 bytes, the upper limit of the realizable bus bandwidth is 1.6G bytes/second. Note that the timing chart of the case using the conventional "snoopy cache" technique is as shown in FIG. 5 in which the upper limit of the realizable bus bandwidth under the same conditions is 200M bytes/second.

Three alternative examples are described below.

One of them uses various interconnection networks other than a multiplexer as a data path switch. For example, a crossbar, omega network or the like may be used. However, as described before, the multiple data paths must be such that the order of the snoop is reflected to the order of data transfer much enough to maintain data consistency among caches.

The second is a technique which increases the velocity of data transfer from one cache to another. This is explained with reference to FIGS. 2 and 3. Consider the case where data corresponding to the memory module 9d are transferred from the snoopy cache 2a to the snoopy cache 2d. First, the data path controller 12 controls the multiplexer 11d and connects the data path 6a to the data path 8d. At the same time, the data path controller 12 controls the multiplexer 10d and connects the data path 8d to the data path 6d (shown by a dotted line in FIG. 3). Then the data path 6a is connected to the data path 6d, and data corresponding to the memory module 9d can be transferred from the snoopy cache 2a to the snoopy cache 2d. This modification makes it possible to transfer data at a speed twice higher than the aforementioned method, that is, transferring data from one cache to another by reading data from the one cache to a memory module and afterward writing from the memory module to the another cache.

The final is a technique that changes correspondence of the cache lines with the memory modules. Here again, let the length of the cache line be 8 times wider than the data bus. However, assume that 8 data piece having the bus width constitutes a single cache line and are interleaved into the memory modules 9a to 9h in such a way that the data pieces are stored in order of the youth of their addresses in to the memory modules 9a, 9b, . . . , and 9h. For example, data D1, D2, . . . , and D7 having the data bus width of a single cache line are sequentially stored in the memory modules 9a, 9b, . . . , and 9h. The address at this time is used as follows:

A) Several least significant bits will designate respective bytes of a data bus width data piece. They are ordinarily transferred in a decoded form as byte enable.

B) Three subsequent less significant bits will designate the memory module in which the data bus width data piece is located. At the same time, they will designate the location of the data bus width data piece in the cache line.

C) The remaining more significant bits will designate the location of the cache line in the memory module.

Figure 6:
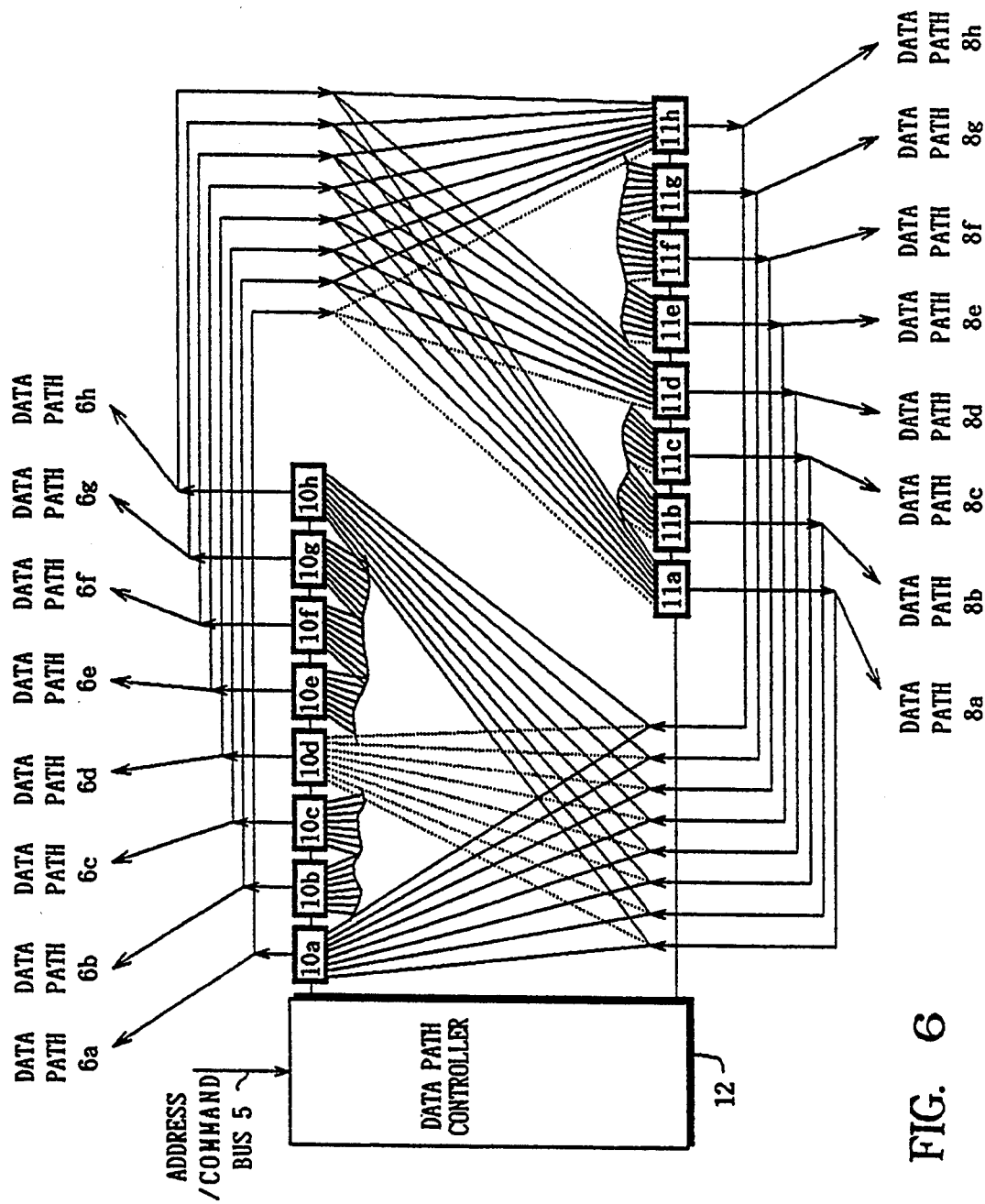
FIG. 6 is a block diagram of the data path switch for explaining the operation of an alternative example.

A data transfer method from a cache to the memory and from one cache to another under this situation is explained with reference to FIGS. 2 and 6. Although FIG. 6 is the same as FIG. 3 except that data paths shown by dotted lines are different.

1) When data are read from memory into cache:

Data are always read from all memory modules. Consider the case where the snoopy cache 2d reads data. Using the address/command issued on the address/command bus 5 by the snoopy cache 2d, the data path controller 12 controls the multiplexer 10d and connects first the data path 8a to the data path 6d. Through this data path (the leftmost one of the paths shown by dotted lines in FIG. 6), data from the memory module 9a are read into the snoopy cache 2d. In the next bus cycle, the data path controller 12 controls the multiplexer 10d and connects the data path 8b to the data path 6d. Through this data path (the second one from the left end of paths shown by dotted lines in FIG. 6), data from the memory module 9b are read into the snoopy cache 2d. Similarly, data from the memory modules 9c to 9h are read into the snoopy cache 2d.

2) When data are written from cache into memory:

Data are always written into all memory modules. Consider the case where the snoopy cache 2a writes data. Using the address/command issued on the address/command bus 5 by the snoopy cache 2d, data path controller 12 controls the multiplexer 11a and connects first the data path 6a to the data path 8a. Through this data path (the leftmost one of paths shown with dotted lines in the right half portion of FIG. 6), data from the snoopy cache 2a are written into the memory module 9a. In the next bus cycle, the data path controller 12 cancels connection of the preceding cycle, controls the multiplexer 11b, and connects the data path 6a to the data path 8b. Through this data path (the second one from the left end of paths shown with dotted lines in the right half portion of FIG. 6), data from the snoopy cache 2a are written into the memory module 9b. Similarly, data from the snoopy cache 2a are written into the memory modules 9c to 9h.

3) Data transfer from one cache to another:

Data transfer from one cache to another is attained by writing data from a cache into an associated memory module and by reading them again. This technique permits reading data to be started from a cycle subsequent to the bus cycle in which writing data is started. In addition, data transfer can also be effected by simultaneously establishing the writing data path and the reading data path as done by the second alternative example.

The use of this technique gives such an advantage that currently continued memory access and subsequently commenced memory access never conflict on the memory modules and that the average bus bandwidth increases. However, since this technique requires memory of the same access time as the bus cycle, the memory system becomes very expensive if existing semiconductor memory is utilized.

According to the invention, in a tightly coupled multiprocessor system having a plurality of processors provided with respective private caches and having shared memory space, and employing the snoopy cache technique for maintaining the data consistency among the caches, the the interconnection network structure can be introduced without any adverse effect on the snoopy cache technique, and significant increase in the transfer bandwidth of the memory bus can be achieved.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new and desire to secure by Letters Patent is:

1. A multiprocessor system comprising:
    a plurality of processors;
    a main memory comprising a plurality of sections;
    a plurality of cache memories provided for said processors;
    interconnection network means for selectively connecting said cache memories to said sections for the transfer of data therebetween in accordance with address information for said data;
    shared bus means coupled to said cache memories for transferring said address information to said cache memories; and
    control means provided for said cache memories for monitoring said address information transferred through said shared bus means to ensure consistency of data stored in said cache memories with data stored in said main memory.

2. The multiprocessor system according to claim 1 wherein said address information contains a portion identifying the section of said main memory that is being accessed for data transfer, said interconnection means connecting one of said cache memories to the section identified by said portion of said address information.

3. The multiprocessor system according to claim 1 wherein said cache memories store units of data comprising segments, said main memory being organized into said sections in such a manner that the segments of a unit of data stored in one of said cache memories are distributed among said sections.

4. The multiprocessor system according to claim 1 wherein data transfer between said cache memories is performed by data transfer from a source cache memory to said main memory and data transfer from said main memory to a destination cache memory.

5. A multiprocessor system comprising:
    a plurality of processors;
    a main memory comprising a plurality of sections;
    a plurality of cache memories provided for said processors;
    interconnection network means for selectively connecting said cache memories to said sections and to said cache memories for the transfer of data therebetween in accordance with address information for said data;
    shared bus means coupled to said cache memories for transferring said address information to said cache memories; and
    control means provided for said cache memories for monitoring said address information transferred through said shared bus means to ensure consistency of data stored in said cache memories with data stored in said main memory.

6. A data transmission apparatus used in a multiprocessor system having a plurality of processors, cache memories provided for said processors, and a main memory which comprises a plurality of sections, comprising:
    interconnection network means for selectively connecting said cache memories to said sections of said main memory for the transfer of data therebetween in accordance with address information for said data; and
    shared bus means coupled to said cache memories for transferring said address information to said cache memories.

* * * * *